J. A. Ehle,
Converting Motion.

N° 64,852. Patented May 21, 1867.

Witnesses:

Inventor:
Jas A Ehle
Per Munn & Co
Attorneys

United States Patent Office.

JAMES A. EHLE, OF GREEN BUSH, WISCONSIN.

Letters Patent No. 64,852, dated May 21, 1867.

---

IMPROVEMENT IN CONVERTING RECTILINEAR INTO ROTARY MOTION.

---

The Schedule referred to in these Letters Patent and making part of the same.

---

TO ALL WHOM IT MAY CONCERN:

Be it known that I, JAMES A. EHLE, of Green Bush, in the county of Sheboygan and State of Wisconsin, have invented a new and useful Improvement in Converting Rectilinear into Rotary Motion; and I do hereby declare that the following is a full, clear, and exact description thereof, which will enable those skilled in the art to make and use the same, reference being had to the accompanying drawings forming part of this specification.

The object of my invention is to transmit power for propelling machinery and other purposes without the use of the crank; and my invention consists in operating a balanced lever or "working-beam" with sliding carriages and hooks attached upon polygons or triangles, so that the power shall be transmitted to a shaft in a continuous rotary motion. In the accompanying drawings—

Similar letters of reference indicate corresponding parts.

Figure 2:
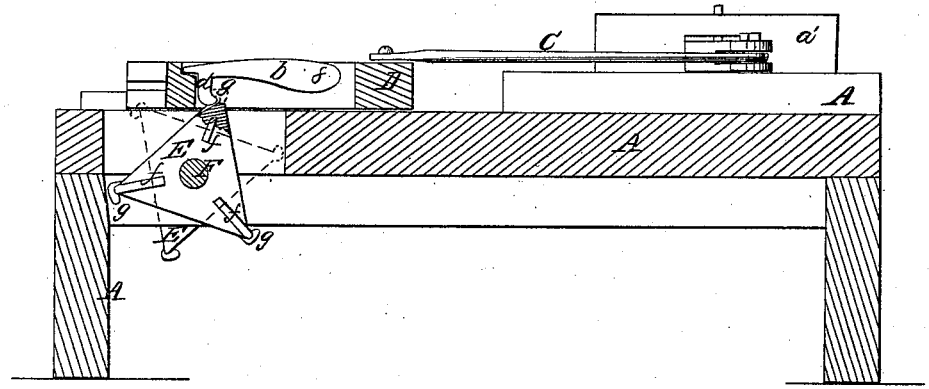
Figure 2 is a vertical longitudinal section through the line $x\ x$ of fig. 1.
Figure 1:
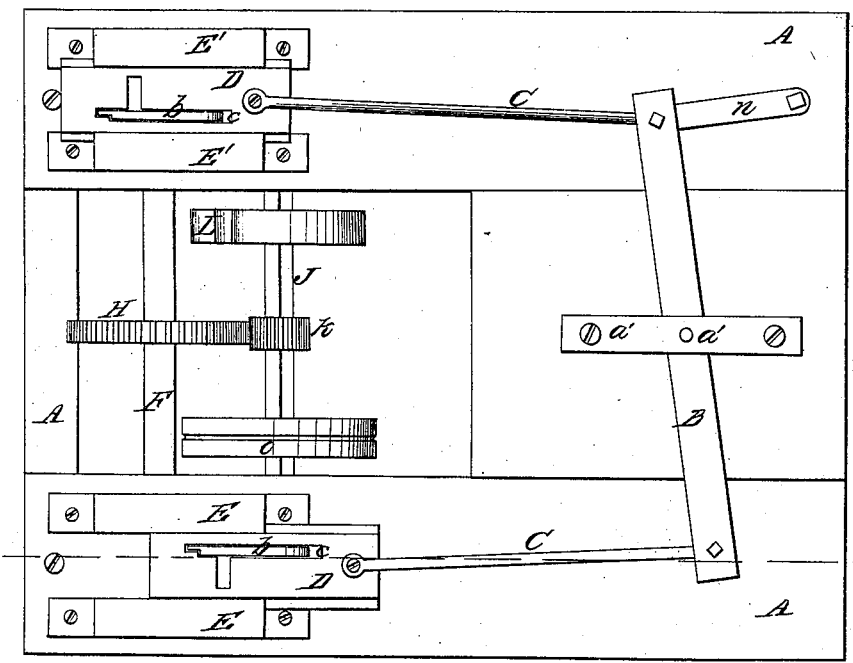
Figure 1 represents a plan or top view of my machine.
Figure 3:
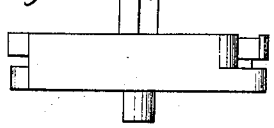
Figure 3 shows one edge of a triangle, with a section of the shaft upon which the triangles are hung.

A represents the framework or platform to which the machinery is attached. B is the lever or working-beam with its pivot or fulcrum at $a$. $a'$ is a cap which is screwed or bolted to the platform, and which is cut out on its under side, leaving a mortise or space for the lever to work in. The pivot $a$ passes through this cap and through the lever down into the platform. C C are two connecting-rods attached to the lever B at one end. D D are two carriages which slide in ways or guides E', which guides are attached to the platform by screws or bolts. The rods C C are attached to these carriages at their other end. These parts of the machine, that is, the lever B, the connecting-rods C, and the carriages D, all have a horizontal motion; the carriages, of course, obeying the motion of the lever B. The carriages are mortised out from their top through, or vertically, the mortise forming a long slot hole in which is laid a bar, $b$. This bar is hung at one end on the pivot $c$, which allows it to have a vertical motion at the opposite end. At the other end of the bar $b$ there is a hook, $d$, which operates upon the triangles when the machine is in motion, as seen in fig. 2. E represents the triangles. These triangles are placed upon a horizontal shaft, F, in such a manner and in such a position that their edges or triangular sides correspond with the hooks on the bars $b$. Into the triangular corners, on a line to the centre, there are pieces of metal let in and fastened to the triangles; these pieces are represented by $f$ in the drawing. The ends of these pieces project from the corner, each having the form of a hook; this hook is seen at $g$. This projecting hook receives the hook $d$ on the end of the bar $b$, as seen in fig. 2. The triangles are upon the ends of the shaft F; the shaft being supported by bearings attached to the frame inside of the triangles. In the middle of this shaft F there is fixed a spur-wheel, H. Lying parallel with the shaft F there is another shaft, J, which is also supported by the frame or platform, having upon its middle portion a spur-pinion wheel, $k$, which works in the wheel H by which it is revolved. There is also on this shaft J another wheel, L, having a cam projection on its periphery represented by $m$; this cam is designed to regulate the motion of the slide-valve of the engine by which my machine is driven. The attachment of my machine is effected through the short connecting-rod $n$; but I do not confine myself to any particular method of connection. The shaft J has three revolutions, while the shaft F has one, the diameters of the wheels H and $k$ giving them that motion. This motion gives the cam-wheel L three revolutions, while the triangle has but one. The three corners of the triangle correspond with the revolutions of the cam-wheel and the motion of the slide-valve of the engine. The rotary motion is transferred from my machine by the band-wheel $o$, which also serves as a fly-wheel to steady the motion. It will be seen that by attaching the machine to a reciprocating steam engine, the rectilinear motion of the engine is at once converted into a rotary motion without the aid of a crank.

Having thus described my invention, what I claim as new, and desire to secure by Letters Patent, is—

1. Converting rectilinear motion into rotary motion by the use of polygons, substantially as described.

2. I claim the balanced lever B, the connecting-rods C C, the carriages D, and the guides E, substantially as described, and for the purposes herein set forth.

3. I claim the pins $f$ forming hooks upon the triangles E and the bar $b$, in combination, substantially as shown and described.

4. I claim the cam-wheel L, in combination with the triangle E and the gear-wheels H and $k$, substantially as herein shown and described.

JAMES A. EHLE.

Witnesses:
  ANNA KELLOGG,
  CHARLES K. EHLE.